(12) United States Patent
Steitz et al.

(10) Patent No.: US 8,769,200 B2
(45) Date of Patent: Jul. 1, 2014

(54) METHOD FOR MANAGING HIERARCHICAL STORAGE DURING DETECTION OF SENSITIVE INFORMATION, COMPUTER READABLE STORAGE MEDIA AND SYSTEM UTILIZING SAME

(75) Inventors: Jack E. Steitz, Los Gatos, CA (US); Pierre R. Fichaud, Montreal (CA); Martin D. Casey, Story, WY (US); Benjamin R. Bolton, Stanton, CA (US); James M. Sagawa, Redwood City, CA (US)

(73) Assignee: Xbridge Systems, Inc., Mountain View, CA (US)

( * ) Notice: Subject to any disclaimer, the term of this patent is extended or adjusted under 35 U.S.C. 154(b) by 609 days.

(21) Appl. No.: 13/038,285

(22) Filed: Mar. 1, 2011

(65) Prior Publication Data
US 2012/0226858 A1 Sep. 6, 2012

(51) Int. Cl.
*G06F 12/00* (2006.01)
*G06F 12/08* (2006.01)
*G06F 17/30* (2006.01)
*G06F 12/02* (2006.01)

(52) U.S. Cl.
CPC .......... *G06F 12/08* (2013.01); *G06F 17/30221* (2013.01); *G06F 12/02* (2013.01)
USPC ............ 711/117; 711/161; 711/165; 711/154

(58) Field of Classification Search
CPC .... G06F 12/08; G06F 17/30221; G06F 12/02
See application file for complete search history.

(56) References Cited

U.S. PATENT DOCUMENTS

| | | | |
|---|---|---|---|
| 5,832,522 A * | 11/1998 | Blickenstaff et al. | 1/1 |
| 6,269,382 B1 * | 7/2001 | Cabrera et al. | 1/1 |
| 6,772,409 B1 | 8/2004 | Chawla et al. | |
| 7,149,746 B2 | 12/2006 | Fagin et al. | |
| 7,320,122 B2 | 1/2008 | Chawla et al. | |
| 7,426,512 B1 | 9/2008 | Ben-Natan | |
| 7,426,520 B2 | 9/2008 | Gorelik et al. | |
| 7,437,362 B1 | 10/2008 | Ben-Natan | |
| 7,472,114 B1 | 12/2008 | Rowney et al. | |
| 7,506,371 B1 | 3/2009 | Ben-Natan | |
| 7,673,344 B1 | 3/2010 | Rowney et al. | |
| 7,680,828 B2 | 3/2010 | Gorelik | |
| 7,693,877 B1 | 4/2010 | Zasman | |
| 7,720,889 B1 | 5/2010 | Goodson et al. | |
| 2001/0047372 A1 | 11/2001 | Gorelik et al. | |
| 2004/0225645 A1 | 11/2004 | Rowney et al. | |

(Continued)

OTHER PUBLICATIONS

May 25, 2012 Non-Final Office Action issued by U.S. Patent Office for corresponding U.S. Appl. No. 13/038,235 (May 25, 2012) pp. 1-26.

(Continued)

*Primary Examiner* — Matthew Bradley
*Assistant Examiner* — Arvind Talukdar
(74) *Attorney, Agent, or Firm* — Intellectual Innovations Legal Advisors

(57) ABSTRACT

Examples of methods, systems, and computer-readable media for detection of sensitive information on hierarchical storage management mainframes are described using multiple techniques. The techniques may include determining if data has been migrated from a first storage medium to a second storage medium, recalling the migrated data from a second storage medium to the first storage medium, reading the migrated data, then re-migrating the data to the second storage medium.

20 Claims, 7 Drawing Sheets

(56) References Cited

U.S. PATENT DOCUMENTS

| | | |
|---|---|---|
| 2005/0027723 A1 | 2/2005 | Jones et al. |
| 2005/0086252 A1 | 4/2005 | Jones et al. |
| 2005/0210006 A1 | 9/2005 | Robertson et al. |
| 2006/0005247 A1 | 1/2006 | Zhang et al. |
| 2006/0059154 A1 | 3/2006 | Raab |
| 2006/0101268 A1 | 5/2006 | Cornuejols et al. |
| 2006/0184549 A1 | 8/2006 | Rowney et al. |
| 2006/0224589 A1 | 10/2006 | Rowney et al. |
| 2006/0253476 A1 | 11/2006 | Roth et al. |
| 2006/0282429 A1 | 12/2006 | Hernandez-Sherrington et al. |
| 2006/0282470 A1 | 12/2006 | Yu et al. |
| 2006/0291580 A1 | 12/2006 | Horvitz |
| 2007/0094394 A1 | 4/2007 | Singh et al. |
| 2007/0112864 A1 | 5/2007 | Ben-Natan |
| 2007/0174337 A1 | 7/2007 | LaVergne et al. |
| 2007/0185868 A1 | 8/2007 | Roth et al. |
| 2007/0271548 A1 | 11/2007 | Chawla et al. |
| 2009/0012972 A1 | 1/2009 | Leitner |
| 2009/0094274 A1 | 4/2009 | Gorelik et al. |
| 2009/0100344 A1 | 4/2009 | Heuler et al. |
| 2009/0100402 A1 | 4/2009 | Heuler et al. |
| 2009/0158441 A1 | 6/2009 | Mohler et al. |
| 2009/0204812 A1 | 8/2009 | Baker et al. |
| 2009/0271453 A1 | 10/2009 | Ben-Natan |
| 2009/0300054 A1* | 12/2009 | Fisher et al. ............ 707/102 |
| 2010/0131512 A1 | 5/2010 | Ben-Natan et al. |
| 2010/0131758 A1 | 5/2010 | Ben-Natan |
| 2010/0132024 A1 | 5/2010 | Ben-Natan et al. |
| 2010/0332481 A1 | 12/2010 | Rowney |
| 2011/0093471 A1 | 4/2011 | Brockway et al. |
| 2011/0238827 A1 | 9/2011 | Lunsford |
| 2012/0066183 A1 | 3/2012 | Adkins et al. |
| 2012/0102056 A1 | 4/2012 | Guirard |
| 2012/0226677 A1 | 9/2012 | Bolton et al. |
| 2012/0226689 A1 | 9/2012 | Bolton et al. |
| 2012/0278866 A1 | 11/2012 | Huang |
| 2012/0297146 A1 | 11/2012 | Guthrie et al. |

OTHER PUBLICATIONS

Sep. 25, 2012 filed Response to May 25, 2012 Non-Final Office Action issued by the U.S. Patent Office for corresponding U.S. Appl. No. 13/038,235 (Sep. 25, 2012) pp. 1-11.

Feb. 13, 2013 Final Official Action issued by the U.S. Patent Office for corresponding U.S. Appl. No. 13/038,235 (Feb. 13, 2013) pp. 1-31.

May 13, 2013 filed Response to Feb. 13, 2013 Final Office Action issued by the U.S. Patent Office for corresponding U.S. Appl. No. 13/038,235, (May 13, 2013) pp. 1-11.

Feb. 27, 2013 Final Office Action issued by the U.S. Patent Office for corresponding U.S. Appl. No. 13/038,275 (Feb. 27, 2013) pp. 1-11.

May 28, 2013 filed Response to Feb. 27, 2013 Final Office Action issued by the U.S. Patent Office for corresponding U.S. Appl. No. 13/038,275, (May 28, 2013) pp. 1-12.

Aug. 27, 2013 filed Response to Feb. 27, 2013 Final Office Action and further Response to Jun. 12, 2013 Advisory Action issued by the. U.S. Patent Office for corresponding U.S. Appl. No. 13/038,275 (Aug. 27, 2013) pp. 1-13.

Sep. 27, 2012 Non-Final Official Action issued by the U.S. Patent Office for corresponding U.S. Appl. No. 13/038,275 (Sep. 27, 2012) pp. 1-11.

Dec. 20, 2012 File Response to Sep. 27, 2012 Non-Final Office Action issued by the U.S. Patent Office for corresponding U.S. Appl. No. 13/038,275 (Dec. 20, 2012) pp. 1-11.

* cited by examiner

| KEY | VALUE |
|---|---|
| POS 315 | MINIMUM LENGTH FOUND AT POSITION |
| | MAXIMUM LENGTH FOUND AT POSITION |
| | COUNT FOUND AT POSITION |
| | SAMPLE SIZE |
| | ACCUMULATED LENGTH |
| | VIABILITY FLAG |
| POS 315 | MINIMUM LENGTH FOUND AT POSITION |
| | MAXIMUM LENGTH FOUND AT POSITION |
| | COUNT FOUND AT POSITION |
| | SAMPLE SIZE |
| | ACCUMULATED LENGTH |
| | VIABILITY FLAG |
| POS 315 | MINIMUM LENGTH FOUND AT POSITION |
| | MAXIMUM LENGTH FOUND AT POSITION |
| | COUNT FOUND AT POSITION |
| | SAMPLE SIZE |
| | ACCUMULATED LENGTH |
| | VIABILITY FLAG |

FIGURE 3

| KEY | VALUE |
|-----|-------|
| 11  | 9 |
|     | 15 |
|     | 3 |
|     | 3 |
|     | 35 |
|     | TRUE |
| 22  | 7 |
|     | 9 |
|     | 2 |
|     | 3 |
|     | 16 |
|     | FALSE |
| 33  | 19 |
|     | 19 |
|     | 1 |
|     | 3 |
|     | 19 |
|     | FALSE |
| 65  | 15 |
|     | 15 |
|     | 2 |
|     | 3 |
|     | 32 |
|     | TRUE |

FIGURE 4

METHOD FOR MANAGING HIERARCHICAL STORAGE DURING DETECTION OF SENSITIVE INFORMATION, COMPUTER READABLE STORAGE MEDIA AND SYSTEM UTILIZING SAME

TECHNICAL FIELD

Embodiments of the invention relate generally to discovery and identification of sensitive information, and particularly to the discovery and identification of sensitive information on hierarchical storage management mainframe systems.

BACKGROUND

The electronic storage of sensitive information may present a risk of inadvertent disclosure to the organization storing the information. Accordingly, organizations may review their data storage facilities for the presence of sensitive information, such as credit card or social security numbers.

When organized records of structured data storage facilities are present, organizations can conduct a review of those data storage facilities to identify the presence of sensitive information and to assess the risk of unauthorized access of the sensitive information. It has been found, however, that organizations are typically unable to conduct a review of older or unstructured data sets for the presence of sensitive information. Accordingly, these organizations are typically forced to assume the risk of the unauthorized access or dissemination of sensitive information.

There are guidelines, such as the Payment Card Industry Data Security Standard (PCI DSS), which may help organizations understand how to effectively discover and protect sensitive information. However, these guidelines are generally agnostic regarding the operating system where the data is stored, and mainframe systems tend to be excluded from serious consideration in automated sensitive information discovery applications.

BRIEF DESCRIPTION OF THE DRAWINGS

FIG. 3 is a schematic illustration of a map which may be stored in the map storage of FIG. 1.

FIG. 4 is a schematic illustration of sample values that may be found in the map of FIG. 3.

DETAILED DESCRIPTION

Certain details are set forth below to provide a sufficient understanding of embodiments of the invention. However, it will be clear to one skilled in the art that embodiments of the invention may be practiced without various aspects of these particular details. In some instances, well-known circuits, control signals, timing protocols, computer system components, and software operations have not been shown in detail in order to avoid unnecessarily obscuring the described embodiments of the invention.

Embodiments of the present invention pertain to the identification of sensitive information in mainframe systems. Mainframe systems are computer systems generally used by organizations for bulk data processing applications. Mainframe systems are accordingly designed to store and manipulate large amounts of data. The mainframe system may include one or more processors that may be optimized for efficient access of the large amounts of data accessible to the mainframe. The data is typically organized in data sets, with each data set containing many records—currently for example gigarecords or terarecords being possible in some files. Mainframe systems may operate using particular operating systems, including but not limited to as z/OS and OS390. Embodiments of the present invention may allow for the identification of sensitive information stored in mainframe systems. Challenges for dealing with data discovery on mainframe systems include extremely large data sets, lack of operating system-imposed directory structure, expensive and tightly controlled CPU usage, and older non-standard data storage techniques.

Sensitive information as used herein refers to data that may encode personal information regarding individuals, groups, or entities. Generally, sensitive information includes any information, the storage of which creates a risk to the storing organization of the inadvertent disclosure of the information, such as information that is subject to privacy rules or regulations. Examples of sensitive information include, but are not limited to, credit card numbers, social security numbers, names, and addresses.

General embodiments of systems and methods for identifying sensitive information in mainframe systems have been described in copending application Ser. No. 13/038,235 entitled "Methods for detecting sensitive information in mainframe systems, computer readable storage media and system utilizing same," which application is hereby incorporated herein by reference in its entirety for any purpose. Embodiments of the present invention may advantageously scan hierarchical storage units for sensitive information.

Figure 1:
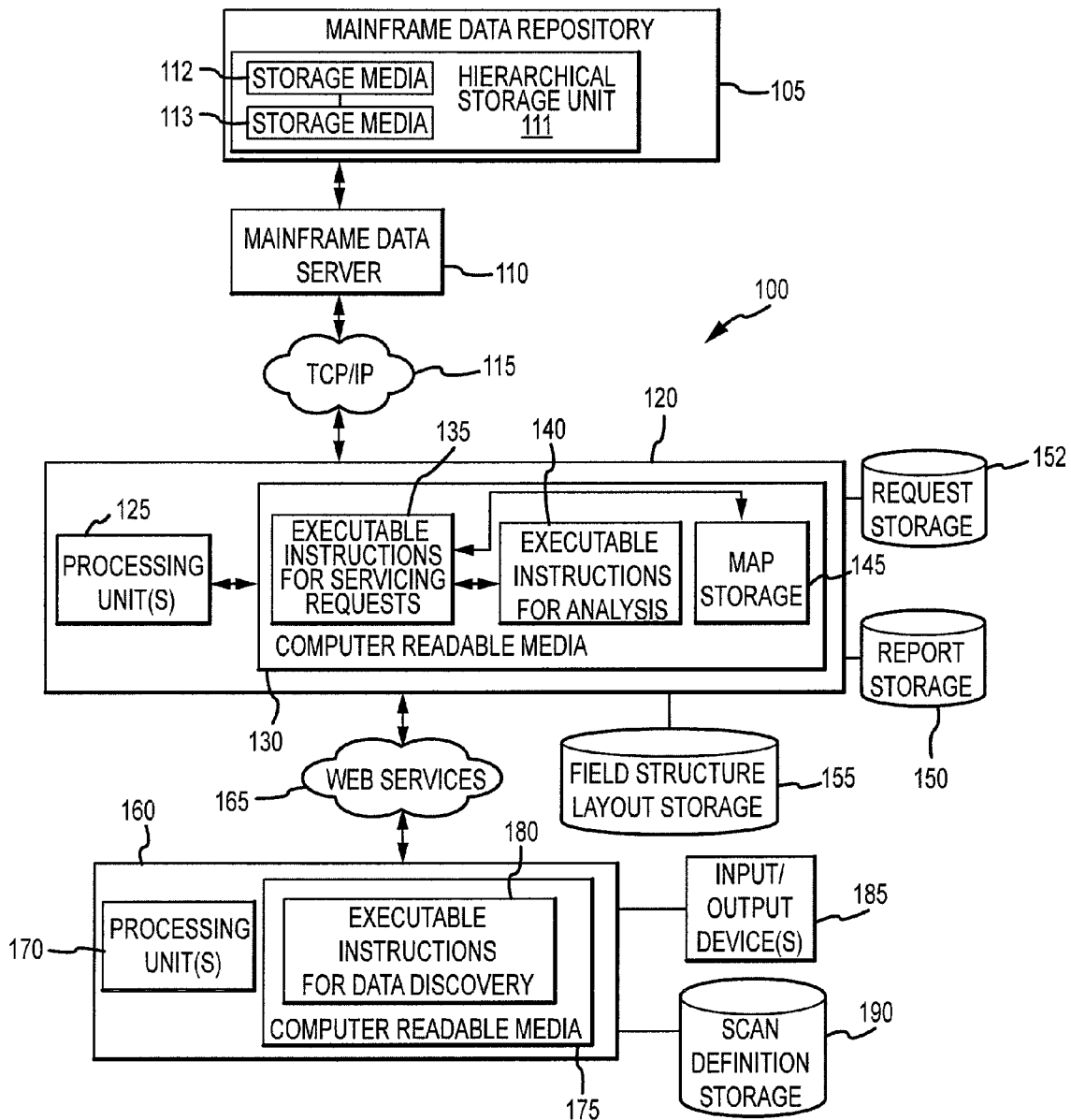
FIG. 1 is a schematic illustration of a data detection system in accordance with an embodiment of the invention.

FIG. 1 is a schematic illustration of a data detection system 100 in accordance with an embodiment of the present invention. A mainframe data repository 105 may store data accessible to a mainframe data server 110. The mainframe data repository 105 may store large amounts of data, including potentially sensitive information in data sets. Generally, any type of electronic storage may be used as the mainframe data repository 105, and there may be more than one mainframe data repository in the data detection system 100. The mainframe data repository 105 may store data in the form of data sets formatted in accordance with a mainframe system architecture, including but not limited to, an IBM zArchitecture data set, such as z/OS or OS390.

Mainframe data server 110 may interface with mainframe data repository 105 for the bulk processing of data stored on the mainframe data repository 105. Accordingly, the mainframe data server 110 generally includes one or more processing units and memory encoded with executable instructions to process data on the mainframe data repository 105, often in a bulk manner. The particular arrangement and contents of the mainframe data repository 105 and the mainframe data server 110 is quite flexible, and generally any mainframe system may be used.

In some embodiments, the mainframe data repository 105 may include hierarchical storage for migrating data between portions of the mainframe data repository 105. Mainframe data repository 105 may include a hierarchical storage unit 111 in communication with two or more data sources, such as data storage medium 112 and data storage medium 113. In some embodiments, a third storage medium may be used. The number of coupled storage media is extendable, and an unlimited number of storage sources may be used. Data storage media 112 and 113 may be of different media types, and may include higher performance storage media such as high-speed hard disk arrays, or lower performance storage media, such as tape and optical discs. Hierarchical storage units are generally commercially available and may provide for the archival of data on progressively slower or cheaper media. Many mainframe systems contain hierarchical storage units. More frequently accessed data is typically kept in the faster or more expensive storage media. As the data is used, the hierarchical storage unit may manage the migration of data from one medium to another. Migration indicator storage 114 may further be in communication with the hierarchical storage unit 111 and the servicing and analysis engines 120.

According to some embodiments, data storage media 112 and 113 may be arranged into levels corresponding to their differing performance characteristics. For example, data storage medium 112 may be a higher performing (high speed) storage type corresponding to level 0 storage, and data storage medium 113 may be a comparably lower performing (low speed) level 1 storage device. In accordance with hierarchical storage management, data that is requested may be recalled from level 1 storage up to level 0 storage so that it may be read. After data is recalled and read, the data may be re-migrated to its previous position. By re-migrating data back to level 1 storage, the system ensures only the most necessary data is stored at the high speed level 0 storage as determined by the hierarchical storage management system. Embodiments of the present invention may accommodate migrated data associated with the mainframe data server.

The mainframe data server 110 may include memory encoding executable instructions that operate in conjunction with processing unit(s) of the mainframe data server 110 to provide functionality allowing the transfer of one or more blocks of records in requested data sets from the mainframe data repository 105 to other components described below over TCP/IP network 115. Data originally stored on the mainframe data repository 105 may be communicated through mainframe data server 110, and subsequently transmitted via TCP/IP protocol 115 to servicing and analysis engines 120 for analysis of the data to identify sensitive information. Although TCP/IP protocol 115 is shown, any communication mechanism, wired or wireless may be used.

The servicing and analysis engines 120 may include one or more processing units 125 and computer readable media 130. The term computer readable media herein is used to refer to a single computer readable medium in some embodiments and in some embodiments multiple computer readable media in communication with one or more processing unit(s). The computer readable media 130 may store executable instructions for servicing requests 135, executable instructions for analysis 140, and map storage 145. The executable instructions for servicing requests 135 may include instructions for reading the data contained on mainframe data repository 105, examples of which will be described further below. The executable instructions for analysis 140 may include instructions for locating sensitive information in data received from the mainframe data repositories, further examples of which are provided below. Although the executable instructions for servicing requests 135 and the executable instructions for analysis 140 are shown on a same computer readable media 130, in some embodiments either or both sets of instructions may be provided on multiple computer readable media, and may not be resident on the same media. Computer readable media herein may include any form of computer readable storage or computer readable memory, including but not limited to externally or internally attached hard disk drives, solid-state storage (such as Flash media), tiered storage solutions, or a storage area network. Generally, the servicing and analysis engines 120 may also be referred to as a 'servicing engine' herein and an 'analysis engine', where the servicing engine refers generally to the executable instructions for servicing requests 135 executed by one or more processing unit(s) 125 and the analysis engine refers to the executable instructions for analysis 140 executed by one or more of the processing unit(s) 125, or other processing unit(s).

Report storage 150, request storage 152, and field structure layout storage 155 may be accessible to the servicing and analysis engines 120 for storage of data generated or accessed by the servicing and analysis engines 120. In some embodiments, map storage 145 may be stored in computer readable media 130 as shown above, however map storage 145 may also be stored in other locations, such as on a disk and accessible to the servicing and analysis engines 120. Contents and use of the map storage 145, report storage 150, request storage 152, and field structure layout storage 155 will be described further below.

A computer system 160 may be in communication with the servicing and analysis engines 120 for user interaction with the servicing and analysis engines 120 over web services 165. In other examples, input/output devices and user interaction may be communicated directly to the servicing and analysis engines 120 through a local user interface. Data produced by the servicing and analysis engines 120 may be communicated to computer system 160 via web services 165. Web services 165 may utilize any viable communication protocol, such as TCP/IP, and may be transmitted over a variety of network mechanisms, wired or wireless, such as the interne. The computer system 160 may include a processing unit 170, and computer readable media 175, which may store executable instructions for data discovery 180. User subsystem 160 may further be coupled to one or more input/output devices 185, as well as to scan definition storage 190. As will be described further below, a user may interact with the computer system 160 using one or more of the input/output devices 185 to define one or more scan definitions to be stored in the scan definition storage 190 and/or communicated to the servicing and analysis engines 120. cause the servicing and analysis engines 120 to identify sensitive information stored in the mainframe data repository 105, and may access stored data regarding the presence or absence of sensitive information on the mainframe data repository 105.

Any variety of input/output devices 185 may be used, including but not limited to displays, keyboard, mice, network interconnects, wired or wireless interfaces, printers, video terminals, storage devices, and any combination thereof. It is to be further understood that the arrangement of the computing components described in FIG. 1 and the location of those components is flexible. Additionally, it should be understood that the mainframe data repository 105, mainframe data server 110, servicing and analysis engines 120, and computer system 160 may be implemented as independent components of a distributed system. In particular, the processing unit(s) used to service requests and analyze data for sensitive information described herein may be different than the processing unit(s) of the mainframe data server 110 used to manipulate the data in the mainframe data repository 105 during normal operation.

Figure 2:
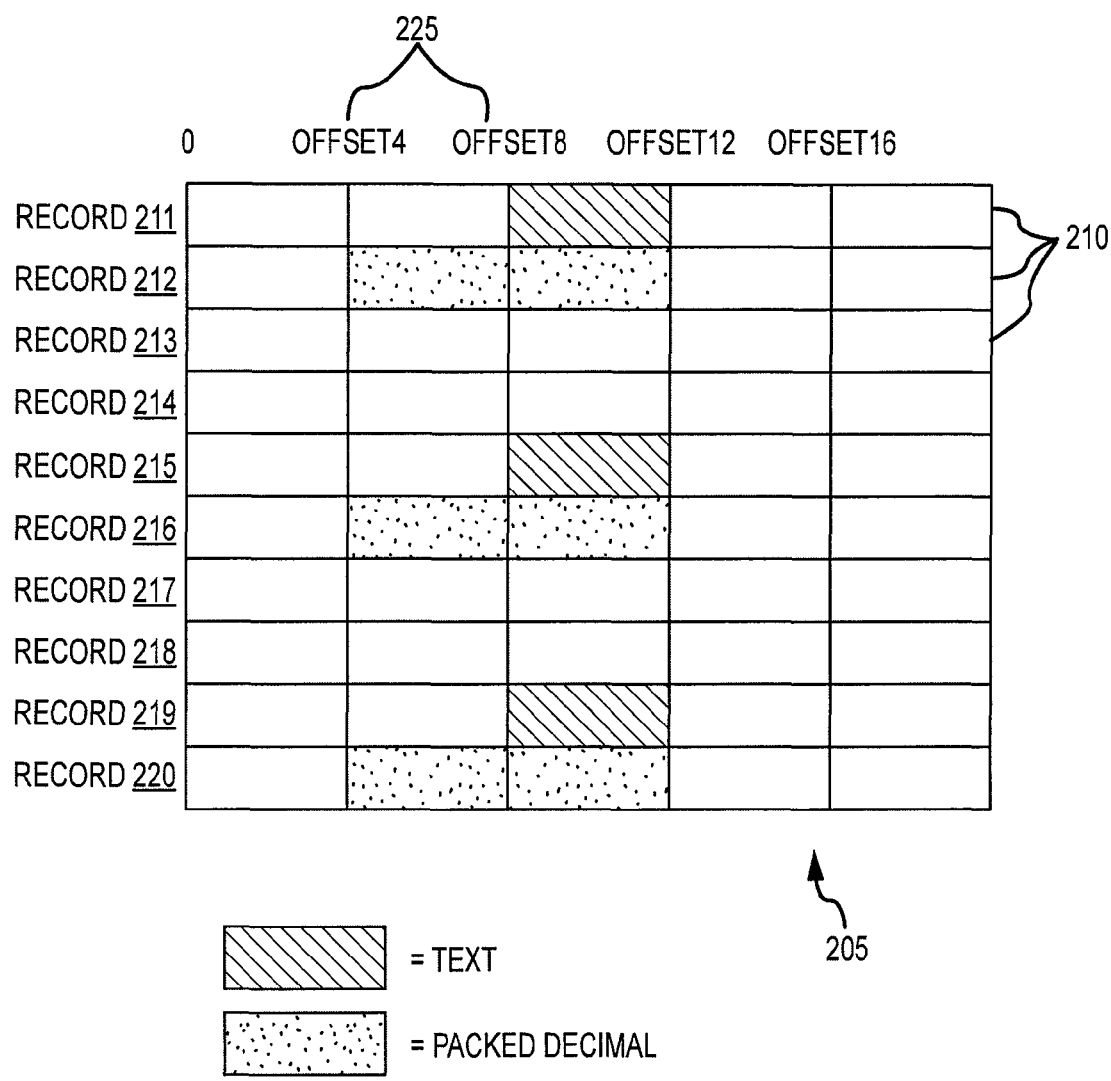
FIG. 2 is a schematic illustration of a block of data records within a data set which may be stored in the mainframe data repository of FIG. 2.

FIG. 2 is a schematic illustration of a portion of a data set 200 which may be stored in the mainframe data repository 105 of FIG. 1. The data set 200 may be grouped into one or more data blocks 205 divided into separate data records 210. The illustrated data block 205 includes 10 data records, data record 211 through data record 220. Each data record 210 may have a certain length, and may have one or more record layout types. Example record layouts may include a variety of data types, such as names, addresses, numbers, and other data types. Because the data found in records 210 may be structured or unstructured, the data records may have no definable record layout. For structured record layouts, data fields may be arranged within a record at regular byte offsets 225. For example, a record layout may have a field defined as "order number" located at offset 4.

While some data blocks 205 may have consistent record layouts across records, other data blocks 205 may include multiple record layouts within the same data block 205. For example, in the illustrated embodiment, every fourth record has a textual non-numeric field such as "order name," while the remaining records in the block contain numeric payment information fields. The determination of data set structure and record layout is typically dependent on programming decisions, as well as the applications used on the system. However, because record layout may be quite varied, and the information needed to create a pre-defined layout description might not be readily available, a pre-defined record layout information may not be available to support sensitive information discovery. For example, in applications programmed with COBOL, multiple record layouts within a single block are possible using the REDEFINES operation. As shown in the illustrated example, records 211, 215, and 219 have a textual field beginning at offset 8, while records 212, 216, and 220 have a packed decimal format beginning at offset 4. The number of record layouts is not limited, and a variety of layouts are possible across the same data set.

FIG. 3 is a schematic illustration of a map 300 which may be stored in the map storage 145 of system 100 of FIG. 1. Map storage 145 may reside in computer readable media 130 or may be persistently stored on an external disk. The map 300 may include a metrics portion 305 and a position portion 310 relating to the position of potential packed decimal fields discovered by system 100. Examples of the discovery process are described further below. Position portion 310 may contain an entry for each potential packed decimal field location 315, along with a corresponding metrics portion 305 for each field location 315 within a record. For every potential packed decimal field location 315, metrics portion 305 may include a minimum length found (element 330), a maximum length found (element 335), a count found (element 340), a sample size value 345, an accumulated length value 350, and a viability flag 355.

The map 300 may be generated during a pre-examination of a first block or other group of records, where the first block or other group of records are searched for packed decimal indicators. When a packed decimal indicator is found at a position, the servicing engine 120 may make an entry in the map corresponding to that position. The servicing engine 120 may then update the metrics portion 305 associated with that position, and the remainder of the first block or other group of records may be searched. The minimum length of a field found at position value 330 and maximum length found at position value 335 may contain the minimum and maximum lengths for all fields found at the corresponding field location 315. That is, the minimum length may reflect the smallest packed decimal field located at that position within the first block of pre-examined records, while the maximum length may reflect the longest packed decimal field located at that position within the first block of pre-examined records. Count found at position 340 may contain the number of times a packed decimal field was found at a given field location 315 within the first block or other group of records. Sample size 345 may contain the number of records contained in the first block or other group of records. In some embodiments, other derived metrics may be calculated from the values stored in map 300 in the metrics portion 305. For example, in order to determine the average length of a potential packed decimal field at a field location 315, the accumulated length 350 for all potential packed decimal fields may be stored, and then divided by sample size 345. Similarly, in order to determine the frequency of potential packed decimal values are found at a particular field location 315, the count found at position 340 may be divided by the sample size in order to determine the percent found at field location 315. Depending on global user defined configuration values and the scan definition, if the metrics portion 305 reaches user defined minimums, the viability flag 355 may be set to indicate a potentially viable packed decimal field location. The metrics may be computed and updated by the servicing engine 120 described above. The executable instructions for servicing requests 135 described above may include instructions for conducting a pre-examination as described herein to generate the map 300.

FIG. 4 illustrates a schematic illustration of a map 300 populated with sample values. As shown, field locations 315 indicate potential packed decimal fields at positions 11, 22, 33, and 65. Accordingly, there is a corresponding entry in metrics portion 305 for each field location. As shown in FIG. 4, the minimum length found (recorded in element 330) in all records of the pre-examined records was 9, and the maximum length found (recorded in element 335) was 15. This means that the packed decimal fields found at those locations range between the sizes of 9 and 15. Additionally, the count found (recorded in element 340) indicates that 3 potential packed decimal fields were found at position 11, during a pre-examination sample size (element 345) of 3. Accordingly there was a packed decimal field 3 out of 3 times, indicating a likely packed decimal location. The accumulated length value 350 for field position 11 is 35, further indicating the total length of all 3 potential packed decimal fields is 35. The average length may be calculated by dividing accumulated length (recorded in element 350) by the count found (recorded in element 340). This length is sufficiently long to contain sensitive information (such as a credit card or social security number). Accordingly, in the example shown, the fields found at position 11 may have met the global user defined configuration values, and so the viability flag 355 has been set to "true," by the servicing engine 120, thereby indicating potentially viable sensitive information resides at a field location 315 of 11. Examples of this process are described further below. In some examples, if the average length value indicates the field is too short to contain sensitive information, the viability flag may be set to "false" by the servicing engine. In other examples, other criteria may be used to evaluate the information stored in the map 300 to determine if a field is a viable sensitive information field, and therefore may be worth the system resources to analyze it. As will be described further below, the servicing engine 120 may utilize the map 300 of FIG. 4 to efficiently process the remainder of records in a data set. For example, the map 300 of FIG. 4 indicates positions 11 and 65 may be viable sensitive information locations. Accordingly, the servicing engine 120 may pass only fields at positions 11 and 65 to an analysis engine to identify sensitive information. In this manner, the analysis engine may not need to search for sensitive information in the entirety of all records, but only those fields identified by the map 300.

Having described a basic configuration of a system, a data set, and a map according to embodiments of the present invention, techniques for detecting sensitive information will now be described. Techniques described below may be implemented through cooperation of executable instructions encoded on the computer readable media 130 and 175, and executed by the processing units 125 and 170 in some examples.

Figure 5:
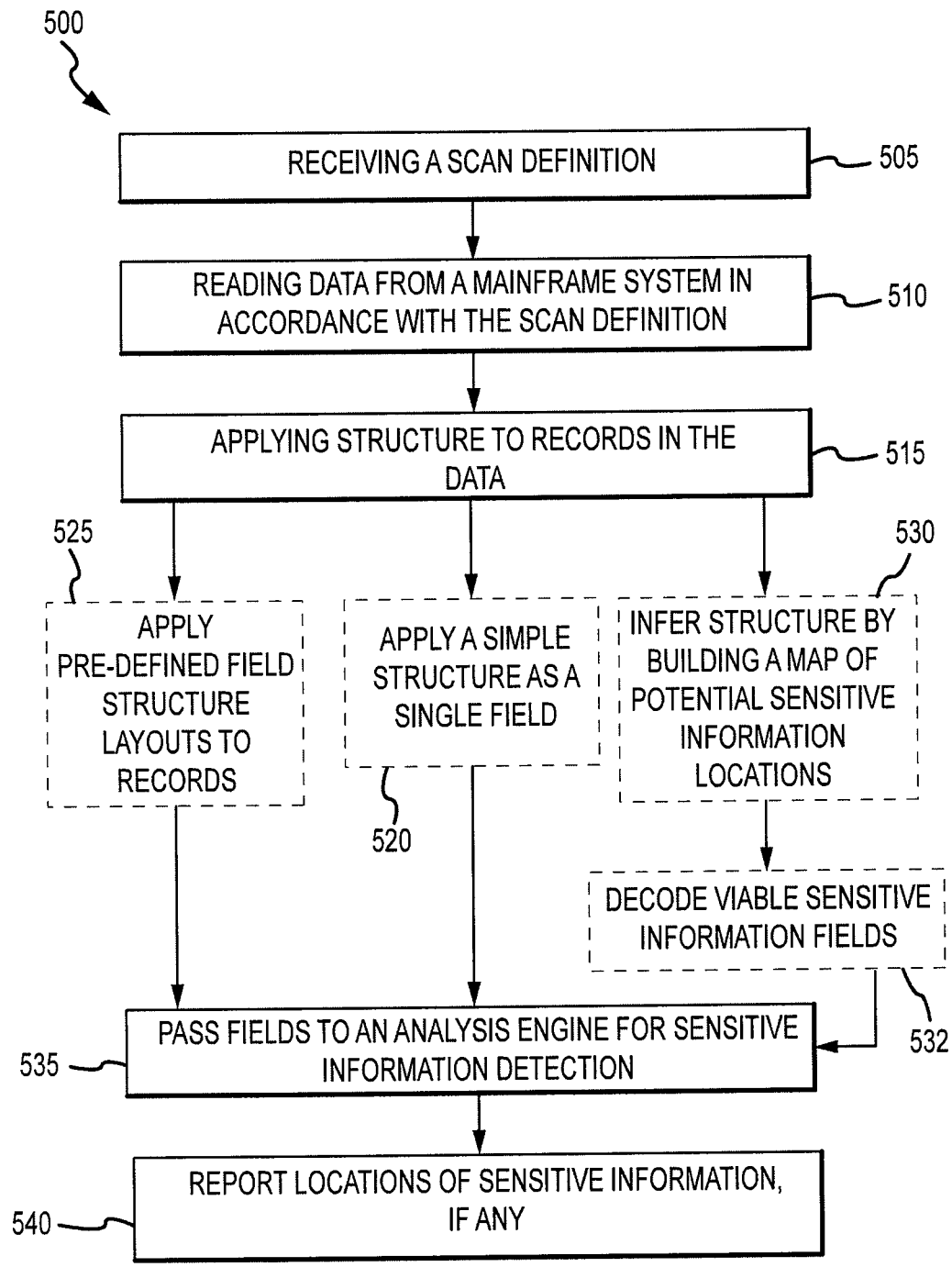
FIG. 5 is a schematic flowchart for one embodiment of a method to detect sensitive information in the mainframe system of FIG. 1.

A schematic flowchart for a method 500 to detect sensitive information in mainframe system 100 according to an embodiment of a method of the present invention is shown in FIG. 5. At method step 505, a scan definition may be received at the servicing and analysis engines 120. In some embodiments, multiple alternative scan definitions may be received by system 100. Referring back to FIG. 1, the scan definition may contain a description of all or a subset of the cataloged data sets stored in the mainframe data repository 105 to be analyzed by the servicing and analysis engines 120. The scan definition may be created by a user using the computer system 160 in some examples. The scan definition may be stored in the scan definition storage 190 of FIG. 1, may be transmitted to the servicing and analysis engines 120, or both. The scan definition may be specified manually by a user using input/output devices 185, or may be automatically generated by a computer software process, such as by accessing stored scan definitions from scan definition storage 190.

In some embodiments, a scan definition may include a name, source description, and a variety of scan parameters that describe which data sets are to be analyzed by the servicing and analysis engines 120. For example, scan parameters may include the name of the mainframe data repository 105 where the desired data resides, a list of data sets to be analyzed, a list of user-supplied scan filters, a list of limitations that are to be placed on the servicing and analysis engines 120, and combinations thereof. A scan definition may contain a flag to indicate if all the data sets with pre-defined record layouts are to be analyzed. If such a flag is set, every data set or table stored in the mainframe data repository 105 that has pre-defined record layouts may be analyzed by the servicing and analysis engines 120. When alterations are made to a scan definition, a log may be created and stored in report storage 150 identifying the user who creates or modifies the definition, along with the associated date and time. Examples of scan definitions and interactions between the servicing analysis engines 120 and the mainframe data server 110 and mainframe data repository 105 are described in application Ser. No. 13/038,275, now U.S. Pat. No. 8,745,053, entitled "Systems and Methods for Managing Mainframe Overhead during Detection of Sensitive Information, Computer Readable Storage Media and System Utilizing Same" which application is hereby incorporated by reference in its entirety for any purpose.

Referring again to the method set forth in FIG. 5, data may be read from a mainframe system in accordance with a scan definition at method step 510. For example, referring back to FIG. 1, the executable instructions for servicing 135 may generate one or more analysis requests for data residing in the mainframe data repository 105. The analysis requests may be stored in the request storage 152 of FIG. 1. Generally, each analysis request may correspond to one data set of the mainframe data repository 105. Each analysis request may contain the name of the requested data set, its current status, the results of any analysis, the number of hits found, the run number, and the media type. In some embodiments, one or more analysis requests may be generated for each scan definition. Accordingly, the executable instructions for servicing requests 135 may include instructions for defining one or more analysis requests based on a scan definition. The servicing and analysis engines 120 may then communicate with the mainframe data server 110 to cause the mainframe data server to access data sets specified by the analysis requests in accordance with any limitations specified in the scan definition, or any applicable limitations specified on a global, scan, or data set specific level by the mainframe or other system.

After receiving the relevant portions of the scan definition at the servicing and analysis engines 120, the executable instructions for servicing 135 may transmit instructions to the mainframe data server 110, which may then communicate with the mainframe data repository 105 to read, pre-examine if building a map, and analyze the requested data sets. In other examples, a scan definition may not be used, and the servicing and analysis engines 120 access data sets requested in some other manner. Upon execution of the request, data sets may be read from the mainframe data repository 105 one block of records at a time, which may then be processed one record at a time, in accordance with the other limitations and restrictions specified in the scan definition or by global configuration items or other limitations. In some examples, a redrive value may be set in the event the process of servicing a request is interrupted or suspended. Redrive examples are described further in application Ser. No. 13/038,275, now U.S. Pat. No. 8,745,053, entitled "Systems and Methods for Managing Mainframe Overhead during Detection of Sensitive Information," which application is hereby incorporated by reference in its entirety for any purpose. The process of servicing a request may be resumed by the servicing and analysis engines 120 resuming block reading at the redrive value. According to embodiments of the present invention, there are several techniques by which data sets may be processed by the servicing and analysis engines 120.

As was described above, data sets stored in the mainframe data repository 105 may not have a structure that is known to the servicing and analysis engines 120. Accordingly, in order to detect sensitive information in the data sets, structure may be applied to records in the data as set forth in method step 515 in the method set forth in FIG. 5. Referring to FIG. 1, the executable instructions for servicing 135 may include instructions for applying structure to records in the data sets, and may operate in cooperation with the processing unit(s) 125 to apply structure to the data sets. Applying structure to data sets generally refers to identifying fields within a record, and may also include identifying and decoding the content of fields. Applying structure does not modify the data itself, rather the organization of the data is identified.

Depending on the scan definition being employed, and the data serviced and analyzed, a variety of techniques may be used to apply structure to the data blocks being processed. The servicing and analysis engines 120 may apply structure in accordance with the executable instructions for servicing 135, or with other executable instructions. As shown in method 500 illustrated in FIG. 5, several exemplary techniques are shown for applying structure to data sets during the servicing process. Any combination of techniques may be used in different examples, including in some examples using only one of the techniques set forth in method steps 520, 525, 530, and 532, using only two such techniques, or using a combination of such techniques. The dashed lines surrounding method steps 520, 525, 530 and 532 indicate the selective nature of these method steps—all three need not be used, but all three may be used in some examples—and different techniques may be used for different records in some examples.

In the technique set forth in method step 520, a simple structure of the data set may be inferred. Using this technique, a data set, or block of records from a data set, may be analyzed as if it has a record layout comprising a single field which begins at the start of the record and ends at the end of the record. For example, this may be possible because a simple data set may be a long unencoded string of text that is ready for regular expression analysis. Accordingly, a simple source template may be used by the servicing engine 120, and the data may be passed directly to the analysis engine for sensitive information analysis because the records are already partitioned by a field.

In the technique of method step 525, a pre-defined field structure layout may be applied to records. This technique may be utilized in examples when the structure of all or some of the data is known prior to the initiation of the servicing of the request. If the record structure of an accessed data set, or block of records from a data set is known, then the precise location and length of data fields within a record and across records is known and may be stored as a pre-defined field structure layout. For example, as illustrated in FIG. 2, a pre-defined field structure layout for the block 205 shown may describe a layout with a textual field at offset 8 with a length of 4 for records 211, 215, and 219, as well as packed decimal fields at offset 4 with a length of 8 for records 212, 216, and 220. These pre-defined field structure layouts may be stored in field structure layout storage 155 of FIG. 1, and may be accessed by the servicing and analysis engines 120 when needed during servicing. Accordingly, this technique may permit the servicing and analysis engines 120 to read every field individually for later analysis for sensitive information. However, because structure may not always be known prior to initiation of the process of servicing a request, other techniques may be used in addition to or instead of the use of a pre-defined field structure layout.

In the technique of method step 530, structure may be inferred by building a map of potential sensitive information locations in the data set. The map may be generated by the servicing engine 120, for example the executable instructions for servicing 135 may include executable instructions for generating the map, and may operate in cooperation with the processing unit(s) 125 to generate the map. Method step 530 may be used when the structure of a data set has not been pre-defined or is unknown. In some embodiments, all records to be analyzed may be examined for packed decimal indicators, decoded, and analyzed immediately using any found packed decimal indicators. In some embodiments, however, a portion of records may be pre-examined by the servicing engine to generate the map. The map may then be used by the servicing engine to identify viable sensitive information fields in other data records and pass only those viable sensitive information fields to the analysis engine. In some examples, the servicing engine may read only those viable sensitive information fields in the remaining records to decode and pass to the analysis engine.

In some examples, then, the servicing engine 120 may generate a map containing locations corresponding to packed decimal indicators in pre-examined records. Sensitive information may be contained in packed decimal fields. Packed decimal format is a data format that may be commonly used in mainframe systems. Packed decimal format generally refers to a format in which two decimal digits may be stored in one byte of data. Each byte contains two nibbles, and each nibble may represent a decimal digit. The lower nibble of the rightmost byte is typically used to encode the sign of the data using a hexadecimal digit. For example, 'C' may be used to denote a positive sign and 'D' to denote a negative sign. Because sensitive information is often numerical, such as for example credit card numbers and social security numbers, the location of packed decimal fields may provide an initial indication of a possible location for sensitive information.

Accordingly, a pre-examination of a first data block in a data set may be conducted in method step 530, and the structure of that data set may be determined. The determined data structure may then be applied to the remaining data blocks in the data set. Depending on the structural patterns of the pre-examined block as found in the map 300, similar potentially sensitive information may be detected in the subsequent data blocks of the data set. Examples of this process are described further below. After structure has been inferred in method step 530, candidates for viable sensitive information fields are then decoded to an analyzable format in method step 532. The fields may be decoded, for example, by the servicing engine 120 of FIG. 1. For example, the executable instructions for servicing 135 may include instructions for decoding viable sensitive information fields, and the executable instructions for servicing 135 may operate in cooperation with the processing unit(s) 125 to decode the viable sensitive information fields. After these fields are decoded, they may be analyzed for potentially sensitive information as described further below.

In method step 535, the fields detected by the techniques described in method steps 520, 525, and 530 may be passed to the analysis engine 120. In some embodiments, a regular expression analysis engine may be used to analyze the passed fields in order to detect potentially sensitive information. The servicing and analysis engines 120 may perform the analysis in accordance with the executable instructions 140 or other executable instructions. The servicing and analysis engines 120 may compare the returned potentially sensitive fields to known sensitive information formats, such as 9-digit social security numbers, or 13 digits for encoding credit card numbers. During analysis of the data, data encoded in non-ASCII formats, such as EBCDIC may be converted to ASCII for processing.

In method step 540, during and/or after analyzing the passed fields, the locations of sensitive information, if any, may be stored in report storage 150. A user may then access report storage 150 to view the stored locations of sensitive information. The analysis engine 120 may further record and aggregate the locations of both sensitive and non-sensitive information. That is, the executable instructions for analysis 140 may include instructions for analyzing fields passed to the analysis engine and may include instructions for recording and aggregating the results. The instructions for analysis 140 may operate in cooperation with the processing unit(s) 125 to conduct the analysis and provide the results. The results returned by the analysis engine 120 may be stored in report storage 150 of FIG. 1. Report storage 150 may contain results such as the count of records read, the number of records analyzed, hits found, and errors encountered. Specific information regarding the detected presence of potentially sensitive and the detected likely absence of sensitive information within the mainframe data repository 105, including data locations and masked content, may be stored at the record, block, data set, scan, or even at the system level within report storage 150. Accordingly, a user at the user subsystem 160 may access all information related to the stored reports stored at report storage 150 through web services 165.

Figure 6:
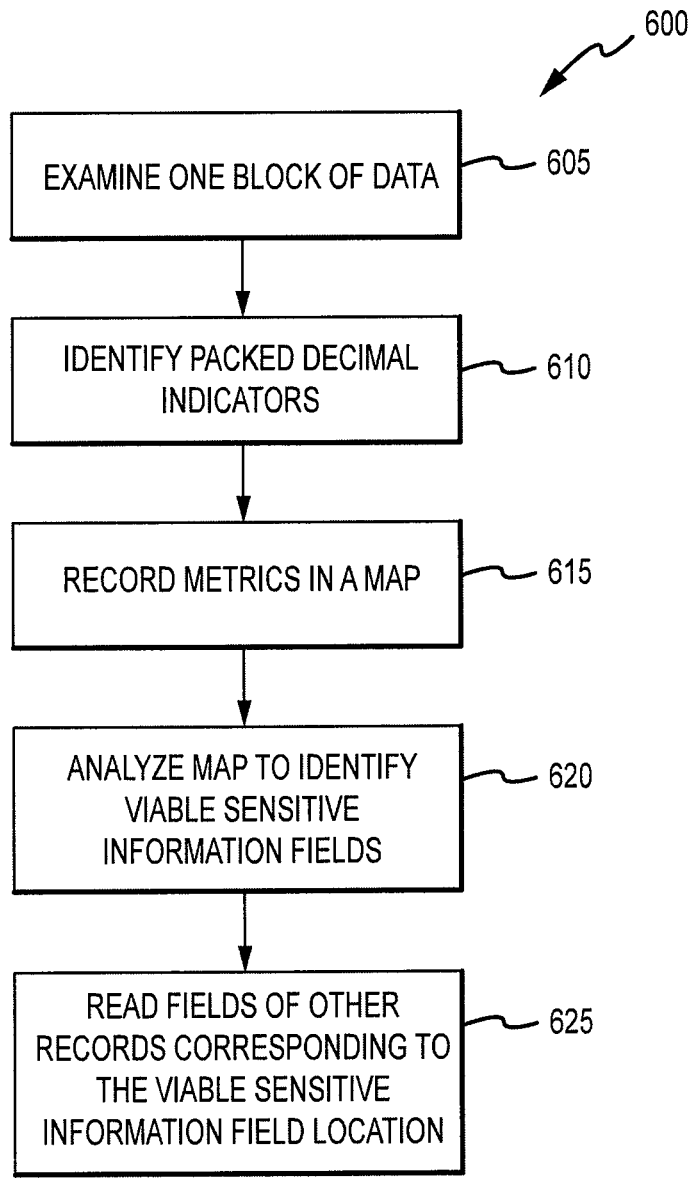
FIG. 6 is a schematic flowchart for one embodiment of a method of inferring data structure to identify potentially sensitive information in accordance with an embodiment of the present invention.

Having described examples of methods for analyzing data sets stored in a mainframe system in FIG. 5, further examples of methods for inferring structure will now be described. FIG. 6 is a schematic flowchart for a method 600 to infer structure of a data set by building a map of potential packed decimal locations in mainframe system according to an embodiment of a method of the present invention. The method 600 may be used to implement method step 530 of FIG. 5. Referring to FIG. 6, in method step 605, a pre-examination may be performed by examining a sample number of, or all, records from the first block of records read from a requested data set in the mainframe data repository 105 with the servicing and analysis engines 120. In some examples, the first block 205 of data may be temporarily stored into a memory buffer in order to avoid the excess time otherwise needed to re-read records. After the first block 205 of data is read, in method step 610 packed decimal indicators may be identified. As described above, each record of the block 205 may be read one record at a time, and examined by searching for packed decimal indicators. A packed decimal indicator in a record may be identified by a bit pattern of 0xC or 0xD, or hexadecimal C or D, using the EBCDIC representation of the data. Hexadecimal C or D may generally correspond to trailing sign bits for packed decimal numbers, and are found by evaluating the low nibbles, or half bytes, of the EBCDIC encoded numbers. As such, once a 0xC or 0xD has been discovered, if its high nibble is a decimal digit, it is possible that a packed decimal number immediately precedes the half byte. It should be noted, however, that despite what may be detected, discovery of a C or D hexadecimal indicator may simply be a coincidental string of binary digits. Accordingly, discovery of potential packed decimal sign bits C and D may not be an absolute guarantee of a packed decimal number. Once a packed decimal indicator has been detected, the bytes immediately preceding the indicator may be checked by the servicing engine to verify a potential packed decimal field exists at that location. After a non-decimal digit is discovered, such as A, B, C, D, E, or F in either nibble of an EBCDIC byte, the method 600 may assume that the previous byte represents the first two digits in the potential packed decimal. The estimated length may be the total number of decimal digits discovered for the potential packed decimal. This is an estimate because the bytes in the record may coincidentally contain two numeric decimal digits that may not be actually part of the original packed decimal value. The identification of potential packed decimal indicators may be performed by the servicing engine 120 of FIG. 1, where the executable instructions for servicing 135 may include instructions for identifying packed decimal indicators and may operate in cooperation with the processing unit(s) 125 to identify the packed decimal indicators.

In step 615 of the method 600 set forth in FIG. 6, the locations of the potential packed decimal fields may be stored in a map 300 together with associated metrics, as shown in map 300 of FIG. 3. For each potential packed decimal field that is read and identified by the servicing and analysis engines 120, the potential field location 315 may be stored in position portion 310 of map 300, along with corresponding metrics values as shown in FIGS. 3 and 4 for later analysis. Additionally, the estimated length for each found potential packed decimal field will be used to augment the values in a metric portion of the map 305 as shown in FIG. 3 for its corresponding position. For example, this may include replacing the minimum length found at position 330 if the estimated length is less than the current minimum length found at position 330 for the metric entry at that field location 315. Similarly, the maximum length found at position 335 may be replaced if the estimated length is greater than the current maximum length found at position 335. The estimated length may be added to the accumulated length 350, and the count found 340 will be incremented. At any point, typically after the map has been completed, these metrics can be used to calculate the average field length and percent found at the field location 315, in order to ultimately determine viability for purposes of the viability flag 355.

In method step 620, the map 300 is analyzed to identify viable sensitive information fields. This process may include pattern identification in order confirm inferences of packed decimals at particular locations within records in the pre-examined block 205. To improve performance, user defined configuration values defined at the global, policy, scan, or request level may be used to augment the map by setting the viability flag 355 for each position capable of containing sensitive information as determined by the user defined configuration values in comparison to the metrics for that position. For example, if a potential packed decimal field is continually found in the same position within a record, it will have a high percentage for percent found, which may be calculated from the metrics found in the map at a position using the formula of count found at position 340 divided by sample size 345. Accordingly, the higher percent found, the higher the likelihood a packed decimal field exists at that location. If percent found is 100%, it is almost certainly a packed decimal field location, and may be indicated as such. However, due to the varied programming practices detailed above, there is a chance that percent found is less than 100%. The servicing and analysis engines 120 may be configured to accept a potential packed decimal field as a viable sensitive information field based on a percent threshold. In some examples, the packed decimal indicator must reside at the same location across records for a minimum of 70% of the total records in order to be considered a viable sensitive information field. Other thresholds may be used, including 60%, 65%, 75%, 80%, 85%, or any other threshold. The threshold may be configurable by the user as a user defined configuration value from the user subsystem 160, and stored in storage accessible to the servicing and analysis engines 120. This threshold may also be optionally disabled by a user in examples where REDEFINES or other causes of non-uniform record structure never occur or are not likely to have occurred. To avoid having to perform this calculation for each record analyzed, the viability flag may be updated and stored in the map 300, thereby using its value in future iterations requiring this calculation.

Additionally, other patterns may be identified during the analysis of potentially viable sensitive information fields. Sensitive information may be of a certain predictable length. As mentioned above, because 9 digits are needed to store for social security numbers, and 13-16 digits are needed for credit card numbers, potential packed decimal fields of this length are more likely viable candidates for analyzing the potential packed decimal location for sensitive information. Accordingly, the servicing and analysis engines 120 may increase the weight for potential packed decimals of this length. That is, the servicing and analysis engines 120 may be more likely to set a viability flag to "true" when the average packed decimal field length is 9 or between 13 and 16. Similarly, if the maximum field length 330 is less than 9 digits long, the likelihood of finding sensitive packed decimals at the record location decreases further. However, other lengths of sensitive information may also be searched depending on the length. In certain embodiments, other types of potential packed decimal field patterns may be identified in order to rule out potential packed decimals and increase examination efficiency. For example, the leading edge of a packed decimal may easily be misidentified for EBCDIC characters, such as spaces, which are identified as 0x40. Since spaces in particular are very common in certain fields, the servicing and analysis engines 120 may stop considering a potential packed decimal after finding 3 consecutive leading spaces. In certain examples, this value may also be a configurable parameter.

Once viable sensitive information fields have been identified in step 620, in step 625, fields of other records corresponding to the viable sensitive information field location may be read. That is, the map may be generated based on a set of records that were examined for packed decimal indicators. The viable sensitive information fields identified by the map may be taken by the servicing and analysis engines 120 as indicative of the location of viable sensitive information fields in other records of a data set, which may not have been pre-examined or used to generate the map. Accordingly, these other records may not be examined for new packed decimal indicators by the servicing engine. Instead, the servicing engine may decode and analyze only a portion of records corresponding to viable sensitive information fields identified by the map.

Figure 7:
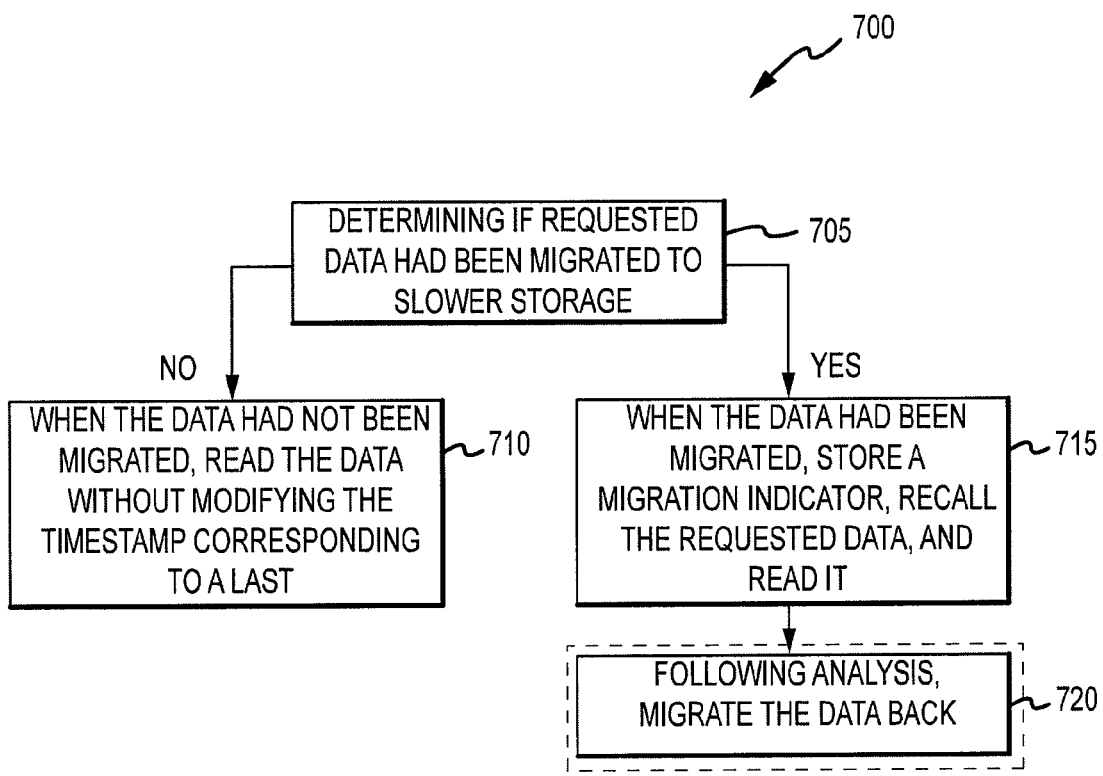
FIG. 7 is a schematic flowchart for one embodiment of a method for reading data from a hierarchical storage management mainframe system in accordance with an embodiment of the present invention.

FIG. 7 illustrates a schematic flowchart for a method 700 for reading data from a mainframe system 100 having a hierarchical storage unit. After receiving a request for particular data sets, method step 705 determines if the requested data has been migrated by the hierarchical storage unit. The request may be initiated by the servicing and analysis engines 120, querying the mainframe data repository 105 in order to determine the precise location of the requested data sets within data storage media. If the data set has been migrated, the mainframe data repository 105 may return a message to the scanning and analysis engines 120 indicating so. Likewise, if the mainframe data repository 105 indicates that the data set is not in a migrated state, the data set may be retrieved as described herein. In some embodiments, the delay between a data set opening and a mainframe status query may allow for the migration status of a data set to have changed in the interim. If the status is determined to have changed, the mainframe data repository 105 may return an error message, repair its internal representation of the migration status of the data set, and re-initiate the request. In hierarchical storage management systems, data is often migrated from high performance storage media to slower storage media. Data migration may be performed as a cost saving measure, as high speed or high performance storage media may be prohibitively expensive for very large amounts of data. Accordingly, data that may not be needed on a high frequency basis may be stored temporarily on slower, less expensive storage while it is not in use. Assuming data storage medium 112 is the higher performing, or level 0 storage medium and data storage medium 113 is the lower performance, or level 1 storage medium, data may be migrated from data storage medium 112 to data storage medium 113. This is more likely to be done if it is not anticipated that the data will be used often. One way of monitoring the use of particular data sets is to check the "last access date" for the data. The more time that has passed between uses, the lower the likelihood the data will be needed. Although two storage media levels are shown in FIG. 1, a variety of configurations may be utilized, including a three or more level hierarchical storage management system.

In method step 710, if data has not been migrated away from level 0 storage media, the data may be read without modifying the timestamp corresponding to the last access date. In this manner, the operation of the hierarchical storage unit may be unaffected by the servicing and analysis of requests to determine if and where sensitive information is in the mainframe data repositories 105. Whenever possible, method 700 may avoid modifying the last access date for data in order to maintain an accurate representation of a system's use of a particular data set. If the last access date is stored as sooner in time than the actual last date the data was used, the data will artificially be considered more important and useful than it actually is within the system. In some embodiments, however, incorrect updating of the last access date is inevitable. Third-party software and systems with restrictive permissions that are beyond the control of system 100 may modify the last access date independently. While the content of the data sets themselves may not be modified, the artificial modification of the last access date may skew data importance within a mainframe system, which may thus impact data migration.

If the requested data sets are determined to have been migrated to a lower data storage level, step 715 stores a migration indicator in migration indicator storage 114, and recalls the requested data from its current storage level to the readable storage medium, or level 0 storage. For example, if a data set was determined to be migrated to level 1 storage, the data would be recalled to level 0 storage where it could be read. The data set content may then be transmitted via TCP/IP protocol 115 to the servicing and analysis engine 120 for servicing the analysis request to and discover sensitive information. After each requested data set has been read, serviced, and analyzed according to the method 500 illustrated in FIG. 5, the servicing engine 120 may re-migrate that data set to its original data storage medium. The servicing engine 120 may access the migration indicators stored in the storage 114 to identify data that should be re-migrated back to a slower level of the hierarchical storage unit. In traditional systems, it may be possible to overload the level 0 storage with concurrent recall requests. In order to account for this possibility, in some embodiments, a user configuration parameter may be set which specifies the maximum number of threads which may concurrently issue recalls. This may be enforced at the outset of each request.

Accordingly, methods and systems have been described above which analyze data stored in mainframe systems for sensitive information. Because the data stored in the mainframe system may not have a readily identifiable structure, structure may be inferred through a search for potential packed decimal indicators. Based on a pattern of the location of packed decimal indicators, structure may be inferred. Fields identified as likely to contain sensitive information may then be decoded and passed to an analysis engine for an analysis to identify the sensitive information. Accordingly, systems described herein may provide for automated analysis of data stored in mainframe systems for sensitive information. Allowing a user to identify sensitive information in their mainframe data may be advantageous in that it may allow the user to more accurately assess their risk of sensitive information exposure.

Moreover, embodiments of the present invention may advantageously minimize a burden placed on the mainframe server due to this analysis. In particular, in some embodiments the mainframe server is involved only to access the requested data and pass the data to a servicing and analysis engines. Because mainframe server processor cycles are often in high demand, performing the servicing and analysis using processing resources other than the mainframe's processor itself may be beneficial in that the impact to the mainframe server may be minimized. From the foregoing it will be appreciated that, although specific embodiments of the invention have been described herein for purposes of illustration, various modifications may be made without deviating from the spirit and scope of the invention. For example, it is appreciated that some or all of the systems and methods disclosed herein may be adapted for use in identification of sensitive information in other computer systems, that is in addition to mainframes.

What is claimed is:

1. A method for analyzing a mainframe system having a hierarchical storage unit for sensitive information, comprising: receiving a request to analyze a first data set of records from the mainframe system; determining that the first data set of records has been migrated by the hierarchical storage unit from a first source to a second source by operation of the mainframe system; recalling the first data set of records from the second source to the first source; reading the first data set of records from the first source; inferring structure in at least one of a plurality of records of the first data set to define fields in the at least one of the plurality of records; analyzing the fields for sensitive information; and re-migrating the first data set of records to the second source responsive to the completion of the analysis.

2. The method of claim 1, further comprising receiving a request to analyze a second data set of records, wherein the second data set of records is managed by the hierarchical storage unit; determining the second data set of records has not been migrated by the hierarchical storage unit; and reading the second data set of records without modifying a last access date associated with the second data set of records.

3. The method of claim 1, wherein the first source performs faster than the second source.

4. The method of claim 1, wherein inferring structure in at least one of a plurality of records to define fields in the at least one of the plurality of records includes treating at least one record as a single field having a uniform structure.

5. The method of claim 1, wherein inferring structure in the at least one of a plurality of records to define fields in the at least one of the plurality of records includes scanning at least one of the plurality of records for fields containing packed decimal indicators; storing locations and lengths of the fields containing packed decimal indicators in a map; and evaluating the map to identify a viable sensitive information field.

6. The method of claim 1, wherein inferring structure in at least one of a plurality of records to define fields in the at least one of the plurality of records includes for at least one record applying a pre-defined field structure layout to the at least one record.

7. The method of claim 1, further comprising: receiving a request to analyze a second set of data records; determining the second data set of records has been migrated from the second source to a third source; recalling the second data set of records from the third source to the first source; reading the second data set of records from the first source; re-migrating the second data set of records to the third source.

8. One or more non-transitory computer readable storage media encoded with instructions executable by one or more processing units of a computing system for analyzing a mainframe system having a hierarchical storage unit for sensitive information, the instructions comprising instructions for receiving a request to analyze a first data set of records from the mainframe system; determining that the first data set of records has been migrated from a first source to a second source by operation of the mainframe system; recalling the first data set of records from the second source to the first source; reading the first data set of records from the first source; inferring structure in at least one of a plurality of records of the first data set to define fields in the at least one of the plurality of records; analyzing the fields for sensitive information; and re-migrating the first data set of records to the second source responsive to the completion of the analysis.

9. The non-transitory storage media of claim 8, wherein the instructions further comprise instructions for receiving a request to analyze a second set of records, wherein the second data set of records is managed by the hierarchical storage unit; determining the second data set of records has not been migrated by the hierarchical storage unit; and reading the second data set of records without modifying a last access date associated with the second data set of records.

10. The non-transitory storage media of claim 8, wherein the first source performs faster than the second source.

11. The non-transitory storage media of claim 8, wherein the instructions for inferring structure in at least one of a plurality of records to define fields in the at least one of the plurality of records include instructions for treating at least one record as a single field having a uniform structure.

12. The non-transitory storage media of claim 8, wherein the instructions for inferring structure in the at least one of a plurality of records to define fields in the at least one of the plurality of records include instructions for scanning at least one of the plurality of records for fields containing packed decimal indicators; storing locations and lengths of the fields containing packed decimal indicators in a map; and evaluating the map to identify a viable sensitive information field.

13. The non-transitory storage media of claim 8, wherein the instructions for inferring structure in the at least one of a plurality of records to define fields in the at least one of the plurality of records include instructions for applying a pre-defined field structure layout to at least one record.

14. The non-transitory storage media of claim 8, wherein the instructions further comprise instructions for receiving a request to analyze a second set of data records; determining the second data set of records has been migrated from the second source to a third source; recalling the second data set of records from the third source to the first source; reading the second data set of records from the first source; re-migrating the second data set of records to the third source.

15. A system for analyzing a mainframe system having a hierarchical storage unit for sensitive information, comprising at least one processing unit coupled to a memory, wherein the memory is encoded with computer executable instructions that, when executed, cause the at least one processing unit to receive a request to analyze a first data set of records from the mainframe system; determine that the first data set of records has been migrated by the hierarchical storage unit from a first source to a second source by operation of the mainframe system; recall the first data set of records from the second source to the first source; read the first data set of records from the first source; infer structure in at least one of a plurality of records of the first data set to define fields in the at least one of the plurality of records; analyze the fields for sensitive information; and re-migrate the first data set of records to the second source responsive to the completion of the analysis.

16. The system of claim 15, wherein the computer executable instructions further cause the at least one processing unit to receive a request to analyze a second data set of records, wherein the second data set of records is managed by the hierarchical storage unit; determine the second data set of records has not been migrated by the hierarchical storage unit; and read the second data set of records without modifying a last access date associated with the second data set of records.

17. The system of claim 15, wherein the instructions for inferring structure in at least one of a plurality of records to define fields in the at least one of the plurality of records include instructions for treating at least one record as a single field having a uniform structure.

18. The system of claim 15, wherein the instructions for inferring structure in the at least one of a plurality of records to define fields in the at least one of the plurality of records include instructions for scanning at least one of the plurality of records for fields containing packed decimal indicators; storing locations and lengths of the fields containing packed decimal indicators in a map; and evaluating the map to identify a viable sensitive information field.

19. The system of claim 15, wherein the instructions for inferring structure in the at least one of a plurality of records to define fields in the at least one of the plurality of records include instructions for applying a pre-defined field structure layout to at least one record.

20. The system of claim 15, wherein the instructions further comprise instructions for receiving a request to analyze a second set of data records; determining the second data set of records has been migrated from the second source to a third source; recalling the second data set of records from the third source to the first source; reading the second data set of records from the first source; re-migrating the second data set of records to the third source.

* * * * *